UNITED STATES PATENT OFFICE.

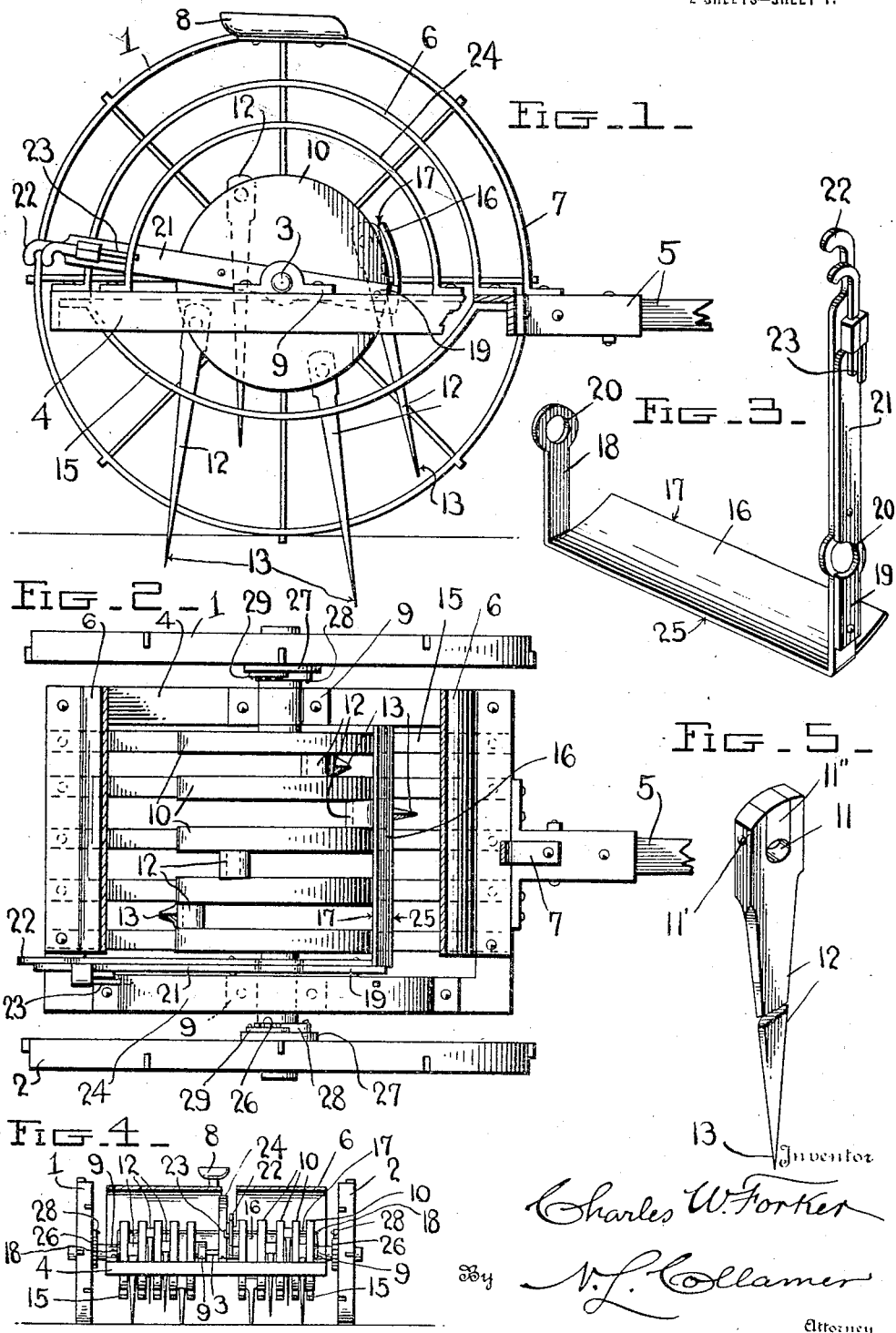

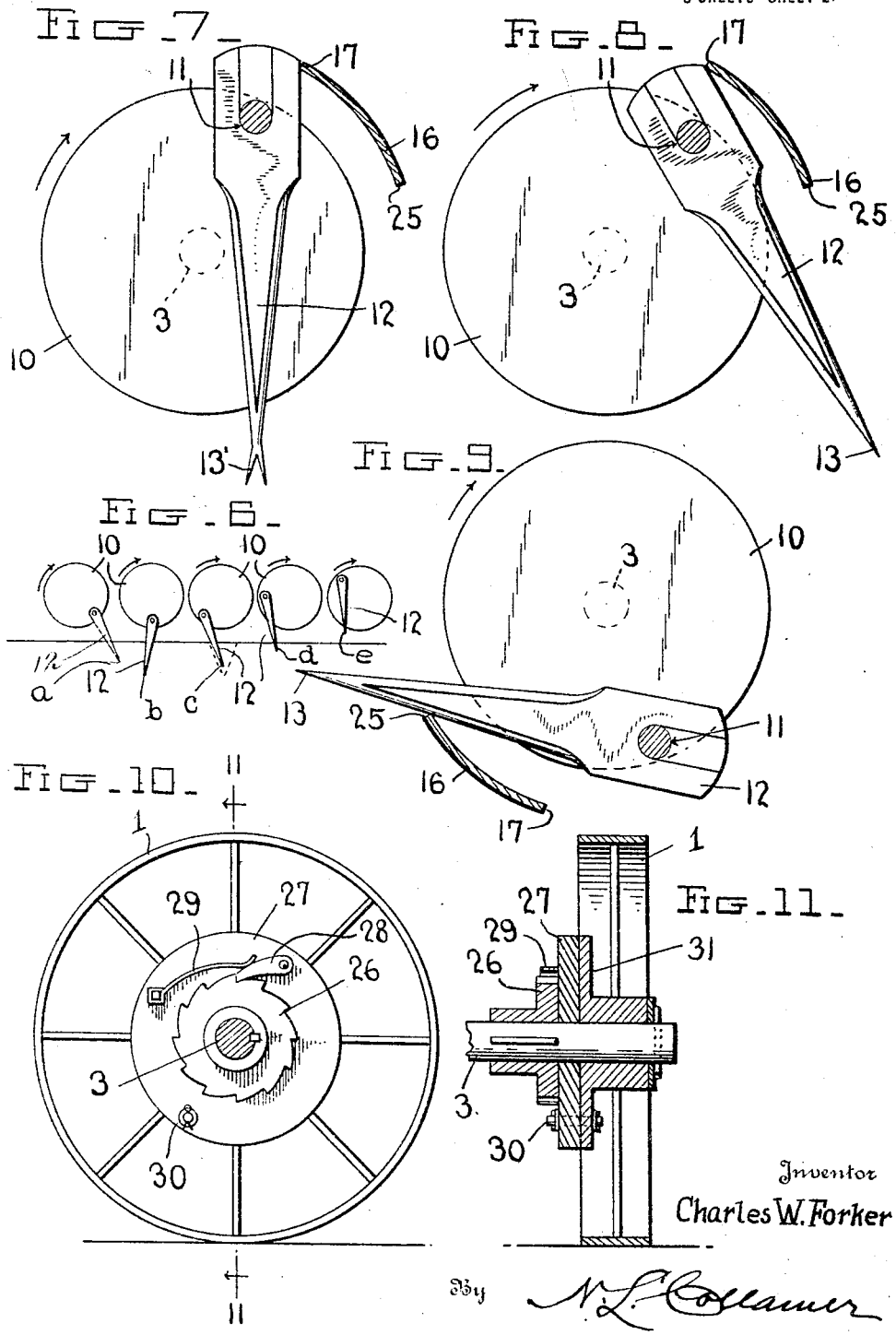

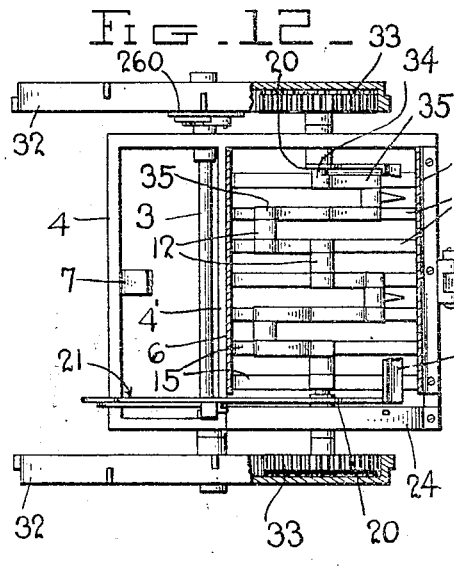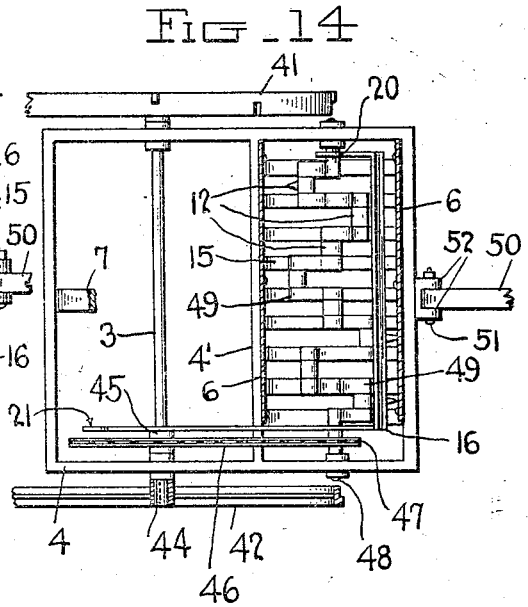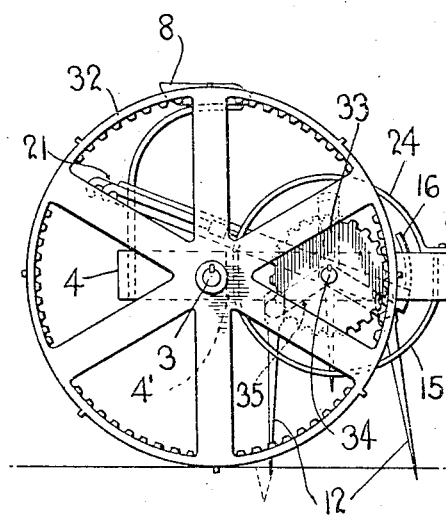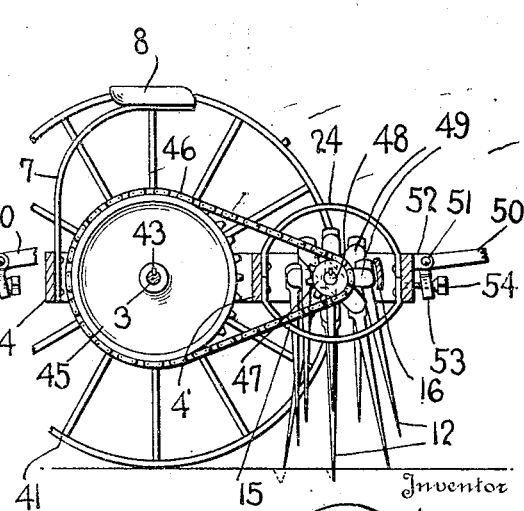

CHARLES W. FORKER, OF POMONA, CALIFORNIA.

SPUDDING-MACHINE.

1,284,636.  Specification of Letters Patent.  Patented Nov. 12, 1918.

Application filed November 13, 1917. Serial No. 201,749.

*To all whom it may concern:*

Be it known that I, CHARLES W. FORKER, a citizen of the United States, and resident of Pomona, Los Angeles county, State of California, have invented certain new and useful Improvements in Spudding-Machines; and my preferred manner of carrying out the invention is set forth in the following full, clear, and exact description, terminating with claims particularly specifying the novelty.

This invention relates to the class of plows and other earth-treating machines, and more especially it is a spudding machine adapted to produce holes in the earth extending through the top soil into the subsoil so as to permit water and moisture at the surface to get into the subsoil.

The invention consists in the details of construction of such a machine described below and shown in the drawings, in which—

Figure 1 is a vertical longitudinal section through this machine complete, Fig. 2 is a plan view thereof with the housing and seat broken away, Fig. 3 is a perspective detail of the adjuster plate, Fig. 4 a transverse section of a double machine, Fig. 5 a perspective detail of a simple form of spud, Fig. 6 a diagram to be referred to hereinafter, Figs. 7 and 8 enlarged sectional details showing the action of the spud under the plate when the parts are in working position and Fig. 9 a similar view when in idle position, and Figs. 10 and 11 are details of the backing ratchet mechanism. Fig. 12 is a plan view and Fig. 13 a side elevation of another form of the machine; and Fig. 14 is a plan view and Fig. 15 a vertical section of yet another form.

This machine is purposely made heavy, being mostly of metal. It is intended for use on land which is cultivated or not and perhaps semi-arid, but its greatest efficiency is found on land which at the surface is composed of much clay to hold the water away from the subsoil and roots, especially alfalfa roots and the like. Such surface soil becomes frozen in winter and caked in summer, and at all times pitted by the hoofs of stock if allowed to roam thereon, and the crust or the pits prevent the melted snow or the rain from sinking into the subsoil as it should. I have accordingly devised a machine for perforating or "spudding" the ground with comparatively deep holes, as near together perhaps as one for every square foot, in its passage thereover; and the machine needs to be heavy in order that the so-called spuds will penetrate the crust properly and swing or move while embedded therein so that the holes produced are not only deep but also oblong in the direction in which the progress of the machine moves the spuds. My preferred construction of this machine will now be described.

Two wide-tread wheels 1 and 2 of ample size are mounted on an axle 3, each driving it by means of a pawl and ratchet mechanism described below while yet permitting the machine to turn corners. The axle supports a frame 4 having a tongue 5 to which is attached the draft, whether animal or tractor, an arched housing 6 rises from the frame and covers the mechanism yet to be described, and a standard 7 also rises therefrom and carries the driver's seat 8. Thus far, except for the wheel mountings, the construction is much like that ordinarily adopted for agricultural machines which are to be drawn over the ground, and details are not essential.

Between bearings 9 which support the frame from the axle the latter is cranked, and by preference I make the cranks in the form of several heavy round plates 10 standing side by side and connected each to each by crank pins arranged irregularly or in spiral order throughout the series so that the crank-pins shall not all be in line. On each crank pin is journaled an eye 11 at the upper end of a spud 12, the same having a long body tapering downward to a sharp point 13 and by preference flattened somewhat on its opposite sides as seen in Fig. 5. The machine shown in Fig. 2 is equipped with but four of these cranks and spuds, but there may be more if desired; and in Fig. 4 I have shown a double machine whose axle has two groups of cranks operating two series or sets of spuds, spaced so that the machine may be driven along a row of small growing plants to work up the ground on both sides thereof without puncturing the earth at all directly at the roots of the plants. The machine could, in fact, be built on a much larger scale than suggested in this view, the spuds might be smaller and closer together, and each might have its tip bifurcated (see 13' in Fig. 7) or otherwise formed so as to more thoroughly stir up the earth. But I find that a single, straight, tapering point, somewhat flattened at its sides as suggested, gives very good results.

Hanging from the frame and preferably curved downward between its front and rear bars are slats 15 between which the spuds depend and by which they are held laterally spaced. Disposed just above these slats and parallel with the axle is a slightly curved adjuster plate 16. This plate is supported by upright hangers 18 and 19 having eyes 20 surrounding and journaled on the axle, about which the plate may turn as a center, and above its eye one hanger is continued into a lever 21 having a handle 22 standing within reach of the driver on the seat. A thumb latch 23 of suitable form is carried by the lever adjacent its handle and engages a toothed rack 24 arching upward from the frame. By tripping this latch and throwing the lever, it is obvious that the driver may adjust the plate around the axle. When the lever is thrown backward to its full extent, the plate will be in substantially the position shown in Figs. 1, 7, and 8 which is the working position in which the machine is actually spudding. As the upper end of each spud is carried over and forward by its crank-pin, it comes into contact with the edge 17 of the plate as seen in Fig. 7, and continued movement causes it to assume the position shown in Fig. 8 where its pointed lower end has been thrown forward at an angle ready to enter the earth in its yet further movement. Meanwhile the spud is held against lateral movement by the slats 15 already described. When the lever is thrown forward to its full extent, the plate 16 assumes substantially the position shown in Fig. 9. In this position the spud points 13 will at all times be held clear of the ground by the rear edge 25 of the plate. This is the idle position of the machine, wherein the motion of the crank-pins will cause the spuds to merely reciprocate over said edge 25 idly at the rear, and this is the position to which the plate 16 should be set when driving from and to the field which is to be treated.

In order to set the machine at work, the plate 16 is set forward at the proper point by the lever mechanism, and the horses started. Rotation of the axle and its various cranks now causes the spuds to have the movement diagrammatically shown in Fig. 6. That is to say, the point first enters the ground as seen at $a$ and while the point of the spud is inclined somewhat forward, then the movement of the crank sinks the point farther as at $b$ and swings the spud to a vertical, next the crank swings it farther as at $c$ so that a hole is made which is elongated in the direction of movement of the machine as seen in dotted lines, and finally the crank draws the spud out of the ground as at $d$ and carries it upward and forward as at $e$ for another stroke. With a set of four spuds a comparatively narrow path will be treated, but the size of the machine is a matter of preference. In any event the machine will perforate or "spud" the soil by piercing the same with a multiplicity of holes whose size, depth, number, and proximity will depend on the form and location of the spuds employed. Each hole will be elongated at the mouth for the reason explained and will afford ready entrance for surface water or melted snow, either of which finds its way through the surface crust to the subsoil where it is needed. The machine may be used on alfalfa lands and on ground where small plants are growing, as the spuds do not destroy the plants or injure their roots when driven astride the rows as suggested. The purpose of making the machine heavy is to give it sufficient weight to drive the spuds forcibly through a considerable surface crust and sink them deep into the soil—thus opening up holes into which the water may settle as has been stated.

In order that the machine as a whole may be free to turn corners, it is necessary for the wheels to turn at different speed. That on the inside of the curve often does not turn at all, or may even reverse temporarily on sharp turns; and yet when a straight course is resumed it is desirable that both wheels shall drive so as to get the effect of their combined traction for actuating the spudding mechanism. One means for accomplishing this idea is illustrated in Figs. 10 and 11. Herein ratchet wheels 26 are fast on the axle inside the drive wheels, and next each ratchet is mounted a disk 27 carrying a pawl 28 borne normally into engagement with the teeth of the ratchet by a spring 29. This disk is loose on the axle and may itself be fast to the drive wheel, or, as shown, separate therefrom and detachably connected therewith as by a key or bolt 30 passed through the disk and a flange 31 at the inner end of the drive wheel hub. The hub is in turn loose on the axle, but the insertion of this key locks it to the disk. When driving the machine idly over the road, as when the spuds are not working, the keys will be temporarily removed or the pawls disengaged from their springs and turned backward; but with all parts connected up, a backing ratchet is provided to permit the machine to turn corners at the ends of the rows as will be clearly understood.

On Sheet 3 of the drawings I have shown certain modifications and amplifications to which the idea is susceptible. Hereinbefore I have spoken of the machine as heavy, as indeed it should be for work on crusted soil; but it is possible to employ the machine for spudding softer soils, and even land in which is growing clover, all kinds of grass or cereals such as rye, wheat, barley, and oats. In this case the spuds should be smaller, should be disposed closer together, should penetrate the earth to various distances according to the requirements, and should operate more rapidly. To accomplish the latter, the cranked axle is replaced by a cranked shaft driven by but at greater speed than the axle by any appropriate means, two of which I have shown. To reduce weight, especially where the parts are more numerous, they may be made light, and this is possible because so much strength is now not always required. The views on Sheet 3 are to an extent fragmentary, but I may describe them as follows:

In Figs. 12 and 13 the frame 4 is supported on an axle 3 whose wheels 32 are internally toothed, and one of them may have the ratchet mechanism above described and herein designated broadly by the numeral 260. The internal gears mesh with gear pinions 33 on a crank shaft 34 journaled in the frame forward of the axle and herein shown as having several somewhat smaller cranks 35, and on the latter are mounted the spuds 12, of which only three are shown in Fig. 13. Obviously, however, there could be more and smaller spuds than in the machine first above described, the path of movement of their upper ends is smaller, they set lower, and they act more rapidly. Other features are as described above, adapted to this construction. The frame 4 may need a cross bar 4' to support the rear end of the housing 6 and the rear ends of the slats 15. The eyes 20 will of course be mounted in this instance on the shaft 34.

In Figs. 14 and 15 one main wheel 41 is loose on the axle and the other, 42, is keyed at 44 thereon, and the backing ratchet mechanism is rendered unnecessary. I might here say that it is not necessary in any construction where the crank shaft is driven from only one of the main wheels. Keyed at 43 on the axle is a large sprocket wheel 45 belted at 46 to a small wheel 47 which is fast on a crank shaft 48, and the latter is shown as having a yet larger number of yet smaller cranks 49. These drive spuds are indicated at 12 in Fig. 15, and if the sprockets have respectively 24 and 6 teeth, the shaft rotates four times as fast as the axle. This type of my invention is preferably employed for perforating the soil with a large number of quite small holes, rather close together.

By withdrawing a screw 11' in Fig. 5, a block 11" at the top of the spud can be removed and the eye 11 becomes a notch, thus releasing the spud which may be withdrawn from its crank so that it can be replaced by one which is of different size or shape. This possibility is present in any type of my machine; and when any machine is to spud deeper, longer spuds can be substituted, or the reverse. But in Figs. 14 and 15 I have shown means for adjusting the depth to which the tips of the spuds shall enter the ground, without changing the spuds themselves. This is accomplished—whenever the cranked axle is used—by tilting the frame 4. The means illustrated consists in pivoting the tongue 50 at 51 to eyes 52 in the front of the frame, and turning it down from its pivot and bifurcating its lower end as at 53, and then a screw or bolt 54 taking through the bifurcation into the frame may be adjusted to vary the inclination of the tongue. The forward end of the latter being maintained at a constant height, such variation obviously tilts the frame and raises or lowers the bearings carrying the crank shaft, and therefore the spuds. Obviously this detail might be employed in the construction shown in Figs. 12 and 13.

My invention is susceptible of other elaborations and refinements not necessary to illustrate, and I reserve the broadest latitude in that respect consistent with the claims below.

What is claimed as new is:

1. A spudding machine comprising a frame mounted on wheels, longitudinal spaced slats carried by the frame, a shaft journaled in the frame and driven by the wheels, cranks in the shaft, spuds whose heads are mounted on the shaft and whose bodies depend between said slats, a plate against which the heads of the spuds strike to throw their lower ends forward, and means for adjusting the position of said plate.

2. The combination with a frame, driving and supporting wheels, a shaft journaled in the frame and driven by the wheels, cranks in the shaft, and a series of spuds loosely mounted on said cranks; of an adjuster plate, standards projecting therefrom and mounted on said shaft, a handle rising from one standard, and means for setting the handle and plate to permit the heads of the spuds to strike such plate earlier or later, for the purpose set forth.

3. The combination with a wheeled frame having bearings on its side bars, a shaft journaled therein and having cranks within the frame, means for driving the shaft from the wheels, and an arched housing and seat on the frame; of a series of spuds within the frame having their upper ends loosely mounted on said cranks, longitudinal guides between which their bodies depend, a transverse plate over whose edge said spuds slide under the motion of the cranks, and means for setting the plate forward in position to be struck by the upper ends of the spuds for throwing their lower ends forward, or setting it backward to serve as a guide for holding the tips of the spuds out of the ground.

4. The combination with a frame, an axle therein having wheels, a crank shaft journaled in the frame, and connections for driving the shaft from the wheels and in the same direction; of a series of spuds whereof each has a head loosely mounted on one of the cranks, a relatively fixed element against which the head strikes to throw the lower end of the spud forward just before it enters the ground, and means for guiding the body of the spud as the shaft rotates.

In testimony whereof I have hereunto subscribed my signature this the 6th day of November, A. D. 1917.

CHARLES W. FORKER.

Witnesses:
JESSE P. EDMONDS,
H. M. LATTIN.

Copies of this patent may be obtained for five cents each, by addressing the "Commissioner of Patents, Washington, D. C."